United States Patent
Ko et al.

(10) Patent No.: US 8,315,555 B2
(45) Date of Patent: *Nov. 20, 2012

(54) PORTABLE MEDIA PLAYER AS A REMOTE CONTROL

(75) Inventors: Steve Ko, San Francisco, CA (US); Stephen O. Lemay, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/360,947

(22) Filed: Jan. 30, 2012

(65) Prior Publication Data
US 2012/0129446 A1 May 24, 2012

Related U.S. Application Data

(63) Continuation of application No. 12/612,493, filed on Nov. 4, 2009, now Pat. No. 8,112,032, which is a continuation of application No. 11/314,291, filed on Dec. 20, 2005, now Pat. No. 7,702,279.

(51) Int. Cl.
*H04H 7/00* (2006.01)
(52) U.S. Cl. ............ 455/3.06; 455/3.03; 455/3.05; 455/3.04; 455/420; 725/61; 725/86
(58) Field of Classification Search ........... 455/3.06, 455/3.05, 41.2, 3.01, 44, 45, 150.1, 154.1, 455/185.1, 186.1, 550.1, 3.03, 3.04, 420, 455/509, 517, 556.1, 575.1, 418, 6.3; 709/203, 709/204; 725/81, 85, 86, 135, 31, 61; 705/500, 705/503, 27; 381/77, 104, 107
See application file for complete search history.

(56) References Cited

U.S. PATENT DOCUMENTS

| | | | |
|---|---|---|---|
| 5,845,282 A | 12/1998 | Alley et al. | |
| 6,192,340 B1 | 2/2001 | Abecassis | |
| 6,914,551 B2 | 7/2005 | Vidal | |
| 7,230,563 B2 | 6/2007 | Vidal | |
| 7,231,516 B1 | 6/2007 | Sparrell et al. | |
| 7,574,177 B2 | 8/2009 | Tupman et al. | |
| 7,702,279 B2 | 4/2010 | Ko et al. | |
| 8,090,309 B2 * | 1/2012 | Krampf et al. | 455/3.05 |
| 8,112,032 B2 * | 2/2012 | Ko et al. | 455/3.06 |

(Continued)

FOREIGN PATENT DOCUMENTS

JP  2003-281169  10/2003

(Continued)

OTHER PUBLICATIONS

International Search Report & Written Opinion for International Patent Application PCT/US2006/047825, mailed May 9, 2007.

(Continued)

*Primary Examiner* — Tan Trinh
(74) *Attorney, Agent, or Firm* — Dorsey & Whitney LLP

(57) ABSTRACT

A portable multimedia player is used to wirelessly access and control a media server that is streaming digital media by way of a wireless interface to a media unit such as a stereo/speakers in the case of streaming digital audio. In one embodiment, the portable multimedia player is wirelessly synchronized to a selected one(s) of a number of digital media files stored on the media server in such a way that digital media file metadata (song title, author, etc.) associated with the selected digital media file(s) only is transferred from the media server to be stored in the portable media player.

25 Claims, 7 Drawing Sheets

U.S. PATENT DOCUMENTS

| | | | |
|---|---|---|---|
| 2002/0042282 | A1 | 4/2002 | Haupt |
| 2004/0078812 | A1 | 4/2004 | Calvert |
| 2004/0090984 | A1 | 5/2004 | Saint-Hilaire et al. |
| 2004/0133914 | A1 | 7/2004 | Smith et al. |
| 2004/0183756 | A1* | 9/2004 | Freitas et al. .................. 345/73 |
| 2005/0042983 | A1 | 2/2005 | Borgward |
| 2005/0210101 | A1* | 9/2005 | Janik ............................. 709/203 |
| 2005/0273790 | A1 | 12/2005 | Kearney et al. |
| 2006/0085821 | A9 | 4/2006 | Simmons et al. |
| 2006/0194612 | A1 | 8/2006 | Chen |
| 2007/0214182 | A1 | 9/2007 | Rosenberg |

FOREIGN PATENT DOCUMENTS

| | | |
|---|---|---|
| WO | 02/065732 | 8/2002 |
| WO | 2005/031605 A1 | 4/2005 |

OTHER PUBLICATIONS

U.S. Appl. No. 11/245,937, filed Oct. 7, 2005.
Salling Clicker 2.2.1, User Manual, Salling Software AB, 2005.
Remote for iTunes (URM-15T), product information datasheet, Keyspan, http://www.keyspan.com/products/usb/urml5t, downloaded Sep. 25, 2005, pp. 1-2.
Express Remote (URM-17A), product information datasheet, Keyspan, http://www.keyspan.com/products/usb/urml5t, downloaded Sep. 25, 2005, pp. 1-2.
"Keyspan Express Remote Supports Apple's Airport Express," Press Release, Keyspan, Nov. 10, 2004.
Keyspan: DMR Software v1.3 for Mac OS X—User Manual, rev. 04.09.01A1, Keyspan.
"Keyspan Express Remote," Product Fact Sheet, Keyspan, Nov. 2004.
Communication pursuant to Article 94(3) EPC for European Patent Application No. 06845481.8, dated Oct. 31, 2008.
Keyspan: DMR Software v1.3 for Mac OS X—User Manual, rev. 04.09.01A1.
Office Action for U.S. Appl. No. 11/314,291, mailed Oct. 28, 2008.
Office Action for U.S. Appl. No. 11/314,291, mailed Apr. 21, 2009.
Notice of Allowance for U.S. Appl. No. 11/314,291 mailed Jul. 17, 2009.
Notice of Allowance for U.S. Appl. No. 11/314,291 mailed Dec. 2, 2009.
Office Action for Japanese Patent Application No. 2008-547340, dated Feb. 10, 2011. (with translations).
Extended European Search Report for European Patent Application No. 10189518.3, dated Jan. 28, 2011.
Kasahara, "Possible issues and futures of DLNA: DLNA guideline v1.1 will be released this Jul.", Jan. 26, 2005.
Notification of the First Office Action for Chinese Patent Application No. 200680048494.4, dated Apr. 26, 2011.
Office action for U.S. Appl. No. 12/612,493, mailed Oct. 13, 2010.
Notice of Allowance for U.S. Appl. No. 12/612,493, mailed Mar. 16, 2011.
Notice of Allowance for U.S. Appl. No. 12/612,493, mailed Jun. 13, 2011.
Notice of Allowance for U.S. Appl. No. 12/612,493, mailed Sep. 28, 2011.
Final Office Rejection for Japanese Patent Application No. 2008-547340, dated Jan. 13, 2012.
Notification of the Second Office Action for Chinese Patent Application No. 200680048494.4, dated Feb. 22, 2012.

* cited by examiner

PORTABLE MEDIA PLAYER AS A REMOTE CONTROL

CROSS-REFERENCE TO RELATED APPLICATIONS

This application is a continuation of U.S. patent application Ser. No. 12/612,493, filed Nov. 4, 2009 now U.S. Pat. No. 8,112,032 and entitled "PORTABLE MEDIA PLAYER AS A REMOTE CONTROL," which is hereby incorporated herein by reference, and which is in turn a continuation of U.S. patent application Ser. No. 11/314,291, filed Dec. 20, 2005 now U.S. Pat. No. 7,702,279 and entitled "PORTABLE MEDIA PLAYER AS A LOW POWER REMOTE CONTROL AND METHOD THEREOF," which is hereby incorporated herein by reference.

BACKGROUND

Due to the increasing capacity and capability of personal computers, it has become popular to use a personal computer as a repository for multimedia content, such as songs, movies, etc. Particularly with music, the increased popularity of storing multimedia data (in the form of digital audio files having various formats such as MP3, AAC and AIFF) on a personal computer has resulted in a variety of products and services. For example, music players (e.g., MP3 player), such as the iPod® multimedia device, and media management applications, such as iTunes software, which as produced by Apple Inc. of Cupertino, Calif., are popular products. With the ability to store large numbers and types of digital audio files in such portable music players, services (such as iTunes® Music Store provided by Apple Inc. of Cupertino, Calif.) have been developed that allow consumers to purchase music (and other digital multimedia data) in a form suitable for storage and playback using portable music players and personal computers. In so doing, many consumers use their personal computer as a primary vehicle for obtaining, storing, and accessing multimedia data.

Although the quality of multimedia playback by computers has improved dramatically in the last several years, these systems still lag behind typical entertainment devices (e.g., stereos, televisions, projection systems, etc.) in terms of performance, fidelity, and usability for the typical consumer. Therefore, in order to utilize the higher quality playback systems, it has become common to install home network systems whereby an individual's personal computer is linked (either wirelessly or wired) to a home entertainment system forming in the process a media system. The media system integrates several interfaces and feature sets into an integrated platform. In this way, the individual is able to listen, view or otherwise access this multimedia data stored on a personal computer using these various entertainment devices. For example, a wireless network interface (e.g., 802.11g based Airport Express® wireless network interface manufactured by Apple Inc. of Cupertino, Calif.) communicates wirelessly with other devices and to serve as a wireless base station or as a repeater (to increase the range of a pre-existing wireless network).

The network interface available on the personal computer can be used to link to any entertainment device, such as a stereo system, television, or home theatre system. This would allow, for example, streaming of multimedia data from a personal computer connected to the network interface (wired or wireless) to an entertainment device connected to the multimedia interface. Unfortunately, however, in order to control certain aspects of the playback of the multimedia data (such as changing a song, an entire playlist, or even controlling volume) a listener wishing to make such changes must be in physical contact with the personal computer in which the multimedia data being played is stored. For example, if a listener is in a living room listening to music being streamed to a living room based stereo by a computer wirelessly linked thereto located in an upstairs den, changing the song being played would require the listener to physically walk to the upstairs den where the computer was located and select the desired song.

One approach used to solve the problem of remote access and control is provided by a zone based system exemplified by Sonos Digital Music System manufactured by Sonos, Inc. of Santa Barbara, Calif. that utilizes distributed units (Sonos™ Zone Players) and a controller unit (Sonos™ Controller). Unfortunately, these units require substantial investment in equipment in order to provide the requisite zone based remote access and control. For example, Sonos Digital Music System requires a user to purchase, or otherwise acquire, a controller as well as one or more zone players depending upon the area.

Therefore, what is desired is a system that leverages existing devices (such as an iPod, AirPort Express, a Mac running iTunes) to provide the remote access and control that would otherwise require the purchase of specialized equipment such as zone controller units and zone players.

SUMMARY

A portable multimedia player (such as the iPod™ manufactured by Apple Inc. of Cupertino, Calif.) is used to wirelessly access and control a media server (such as a personal computer running iTunes™ software). In one embodiment, media server can stream digital media by way of a wireless interface to a media unit (such as a stereo/speakers in the case of streaming digital audio).

As a portable digital media player capable of communicating with a media server, one embodiment can, for example, include at least a wireless network interface, a display device arranged to display a user interface having a number of user selectable items, a processor unit configured to operate the portable digital media player in a first mode or a second mode, and a storage medium configured to store computer program code. The computer program code can includes at least: computer program code for displaying a list of digital media files on a display device of the portable digital media player, the digital media files stored on the portable digital media player; computer program code for receiving a selection signal to play a digital media file; computer program code for playing the selected digital media file on the portable digital media player when the portable digital media player is operated in a first mode; and computer program code for wirelessly sending the selected digital media file to the media server via the wireless network interface when the portable digital media player is operated in a second mode.

As a portable digital media player capable of communicating with a media server, another embodiment can, for example, include at least a wireless network interface, a display device arranged to display a user interface having a number of user selectable items, a processor unit configured to operate the portable digital media player in a first mode or a second mode, and a storage medium configured to store computer program code. The computer program code can includes at least: computer program code for displaying a list of digital media files on a display device of the portable digital media player, the digital media files stored on the portable digital media player; computer program code for receiving a selection signal to play a digital media file; computer program code for playing the selected digital media file on the portable digital media player when the portable digital media player is operated in a first mode; and computer program code for wirelessly sending an indication of the selected digital media file to the media server via the wireless network interface when the portable digital media player is operated in a second mode.

DETAILED DESCRIPTION

Figure 1:
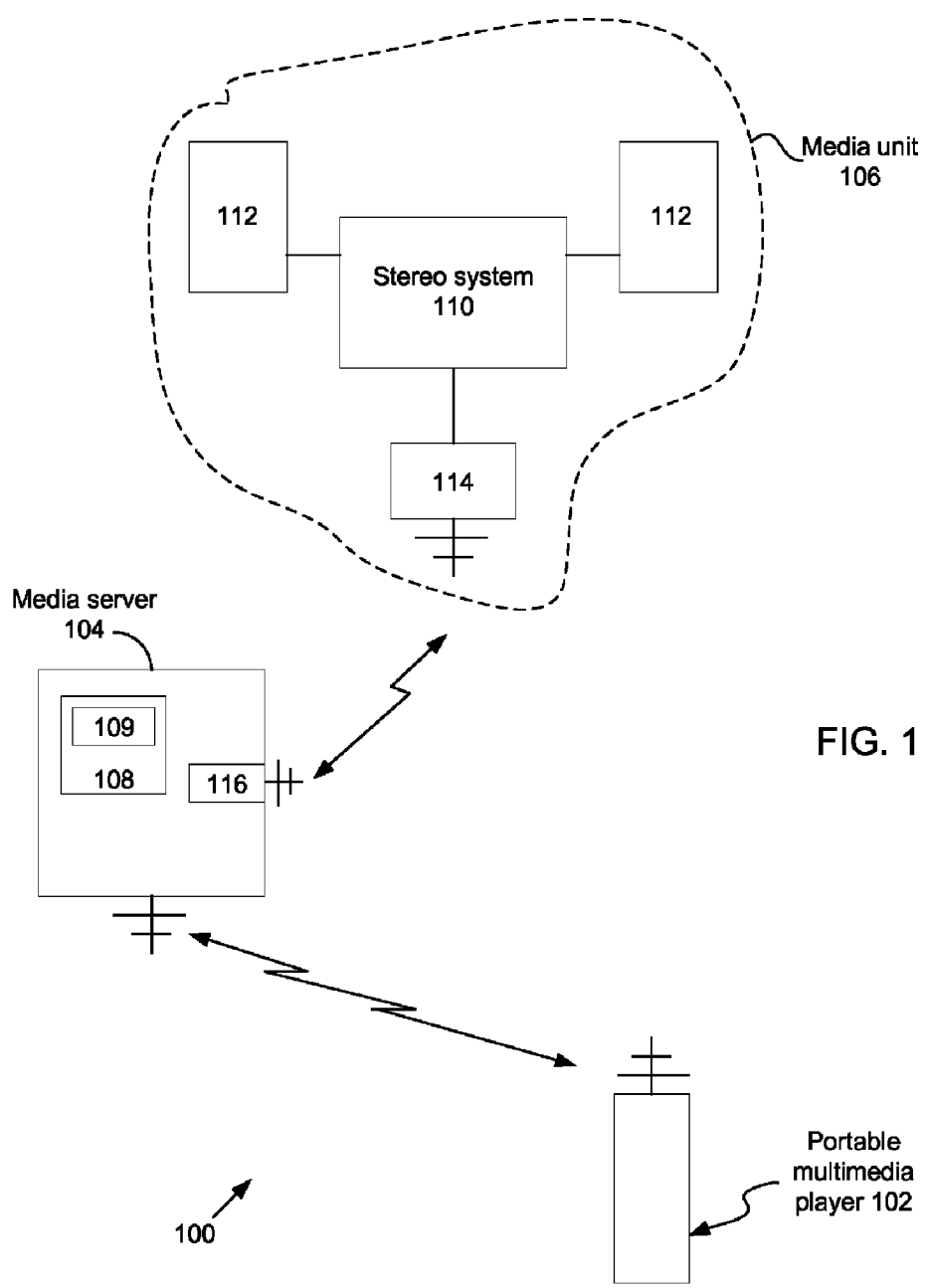
FIG. 1 shows a representative wireless media network and a wireless battery powered portable multimedia player in accordance with an embodiment of the invention.

Reference will now be made in detail to a particular embodiment of the invention an example of which is illustrated in the accompanying drawings. While the invention will be described in conjunction with the particular embodiment, it will be understood that it is not intended to limit the invention to the described embodiment. To the contrary, it is intended to cover alternatives, modifications, and equivalents as may be included within the spirit and scope of the invention as defined by the appended claims.

According to one embodiment, a battery-operated portable multimedia player is used to wirelessly access and/or control a media server. The media server can be implemented by a variety of computing devices. As an example, the media server can be implemented by a personal computer. In response to such wireless access and/or control, the media server can operate to stream digital media by way of a wireless interface to a media unit (e.g., a home audio system, such as a stereo, in the case of streaming digital audio).

In one embodiment, the portable multimedia player wirelessly communicates with the media server so as to receive a media catalog of available media items on the media server. Here, the media catalog is a listing of the available media items, e.g., digital media files, stored on the media server. In one embodiment, the media catalog contains media item metadata (song title, author, etc.). In this embodiment, the digital media items (e.g., digital media files) themselves need not be transferred to the portable media player. As a result, only a relatively small amount of data is required to be transferred to the portable multimedia player, thereby saving valuable battery resources. In addition, by not transferring the digital media items themselves, potential copyright infringement issues can be avoided.

When a user wishes to access and/or control the media server in order to effectuate a change in the media item data being streamed to the media unit (e.g., changing a song being played as an example), the user selects a new media item (e.g., song) to be played by interacting with the portable multimedia player. In one implementation, the portable multimedia player can display a plurality of user selectable items that correspond to different digital media items (e.g., song files). The user of the portable multimedia player can select one of the user selectable items to specify a media item to be played. Once selected, the portable multimedia player wirelessly informs the media server of the specified media item to be played. In one example, the portable multimedia player transmits only some or all of the metadata corresponding to the new media item along with a control signal indicating, for example, that a media item currently being played is to be replaced by the new media item associated with the control signal.

In another implementation, the portable multimedia player can display a user interface that enables the user to control how a media item is to be played. For example, the control provided can alter, change or provide play characteristic, such as volume, equalization, etc., or navigation, such as next, previous, play, stop, etc. In such cases, a control signal alone can be sent since the associated media item is already known by the media server.

Once received by the media server (e.g., personal computer), the media server can then inform the media unit of the control operation requested by the user via the portable multimedia player. For example, if the control operation is a new selected media item to be played, the current media item being played by the media unit is discontinued and transfer of media data pertaining to the new selected media item begins, such that the new selected media item can be played. In this way, the user can indirectly remotely control the output of the media unit using a battery powered portable multimedia player in a power efficient manner.

In yet another embodiment, a portable digital media player (such as an iPod), is bound to a personal computer in such a way that the digital media player wirelessly controls the computer. It should be noted, that the binding of the personal computer and the digital media player includes synchronizing the digital content stored in the digital media player with the media items stored in the computer over a connector such as a USB 2.0 or FireWire cable. In this way, the requirement of additional user interface on the digital media player for choosing, connecting to, and authenticating with the computer is eliminated. Therefore, in this way, only an additional user interface having a top level menu ("remote control" as an example) is needed to control the computer which, when selected, automatically connects and authenticates the computer bound to the portable digital media player.

FIG. 1 shows wireless media system 100 that includes a battery powered portable multimedia player 102, a media server 104, and a media unit 106 in accordance with an embodiment of the invention. As configured, the media server 104 includes a local storage medium 108 that can take any appropriate form such as a hard disk drive, flash memory, etc. arranged to store multimedia content 109 that can include digitized music (e.g., songs), short video files, or full-length video files (e.g., movies). For the sake of this discussion, the media server 104 is taken to be a personal computer arranged to store a number of digital audio files (e.g., song files) in the local storage medium 108 configured as a hard drive. In the described embodiment, the media server 104 is wirelessly coupled to the media unit 106 that in this case takes the form of a stereo system 110 having a number of speakers 112. In the described embodiment, the stereo system 110 includes a wireless network interface 114. The wireless network interface 114 supports a wireless network. The wireless network can take the form of, for example, a "WiFi" interface according to the IEEE 802.11b or 802.11g standards. Other wireless network standards could also be used, either in alternative to the identified standards or in addition to the identified standards. Such other network standards could include the IEEE 802.11a standard or the Bluetooth standard. An antenna required for wireless networking is typically included within the housing of the wireless network interface 114. Such an antenna may take a variety of forms, such as an antenna printed on a standard PCB (printed circuit board). Such antennas are well known to those skilled in the art.

The wireless network supported by the wireless network interface 114 can enable wireless communications between the media server 104 and the media unit 106. In such case, the media server 104 also includes or couples to a wireless network interface 116 such that the media server 104 and the media unit 106 can communicate over the local wireless network via the wireless network interfaces 114 and 116. Furthermore, the portable multimedia player 102 can communicate with the media server 104 in a wireless manner, over the same wireless network (as used between the media server 104 and the media unit 106) or another wireless network.

When the media unit 106 described herein is used to play multimedia content from the media server 104 (hereafter personal computer), the media unit 106 is plugged into a wall outlet for power. The wireless network interface 114 acts as a wireless base station for the wireless network thus enabling the personal computer 104 to communicate with the media unit 106. The wireless network interface 114 is also connected to the stereo system 110 to enable playback of audio files stored on the computer 104 by the stereo system 110. The connection between the wireless network interface 114 and the stereo system 110 may be by way of a digital fiber optic cable that would connect to a digital audio input port on the stereo system 110.

As briefly described above, the wireless network interface 114 has the ability to receive multimedia information from the personal computer 104 over a wireless network connection and output this media information to an entertainment device (e.g., the stereo system 110). Although it is contemplated that audio, video, audio/video, and/or other forms of multimedia may be used with the media system described herein, one exemplary embodiment relates to the sharing of audio data stored on a personal computer with an entertainment device, such as a stereo system.

To provide a relatively simple and user friendly interface to the media output features of media unit 106, it is advantageous to provide access to the media unit 106 from a media application running on the personal computer 104, which is also preferably the application normally used to create, manipulate, or otherwise access the particular type of media file. In one exemplary embodiment, the media application be the iTunes® software for music management and playback produced by Apple Inc. Using the media application, the media unit 106 may be selected as a destination for media playback. The personal computer 104 can be programmed such that the audio content of a media file to be played will be sent to the media unit 106, while system sounds (e.g., beeps, alerts, etc.) will continue to be presented at the personal computer 104.

Communications between the personal computer 104 and the media unit 106 over a wireless network (e.g., wireless network 100) is initiated through a discovery process. One example of such a discovery process uses Bonjour, which is a technology that enables automatic discovery of computers, devices, and services on IP networks. Also known as Zero Configuration Networking, Bonjour uses standard IP protocols to allow devices to automatically find each other without the need for a user to enter IP addresses or configure DNS servers. Various aspects of Bonjour are generally known to those skilled in the art, and are disclosed in the white paper entitled "Bonjour" dated October 2003, and published by Apple Inc., which is hereby incorporated by reference in its entirety. Additional implementation details may be found in the following co-pending patent applications, commonly owned with the present application, which are hereby incorporated by reference in their entirety: (1) "Method and Apparatus for Configuring a Wireless Device Through Reverse Advertising," application Ser. No. 10/102,321, filed Mar. 19, 2002; (2) "Method and Apparatus for Supporting Duplicate Suppression When Issuing Multicast DNS Queries Using DNS_Format Message Packets," application Ser. No. 10/102, 174, filed Mar. 19, 2002; and (3) "Method and Apparatus for Implemented a Sleep Proxy for Services on a Network," application Ser. No. 60/496,842, filed Aug. 20, 2003.

To facilitate communications between the personal computer 104 and the media unit 106, such as to provide media sharing functionality, the wireless network interface 114 for the media unit 106 will advertise over the network that it supports audio streaming to the media unit 106. As required for standard Bonjour operation, the wireless network interface 114 will publish the availability of a service, the name of the device providing the service, the network address of the device, and one or more configuration parameters that are related to the service. The registration of this service advertises particular audio capabilities of the system (e.g., 44.1 kHz sample rate, 16-bit sample size, and 2-channel/stereo samples). The registration of the service might also include security, encryption, compression, and other capabilities and/ or parameters that are necessary for communicating with the device.

In alternative embodiments, additional services may be designed to specify a variety of parameters relating to one or more multimedia input or output devices attached to the media unit 106. Devices that might have particular applicability in a home network environment include speakers, video display terminals, cameras, microphones, etc.

The automatic discovery aspects of devices within the network permit its use in architecting easily configured home networks according to a user's preferences and designs. For example, a user with a large library of music on a computer in one room of a house can create a wireless multimedia network for his entire home simply by deploying a few of the disclosed wireless network interfaces throughout his home. For example, he can put one near the stereo in the living room, and one by the television in the bedroom. By connecting the appropriate multimedia interface, he can serve audio, video, or other content to these devices with a simple selection at his personal computer. For example, he may direct the living room stereo to play his favorite album, and he may direct the bedroom television to show a home movie. This extensible architecture allows a user to configure relationships between sources and destinations of media data without regard or need for buying all components from the same vendor, or other such considerations that might otherwise be required to permit interoperability of disparate devices on a wireless network.

Once the wireless network interface 114 is discovered on the wireless network, the media software running on personal computer 104, e.g., iTunes, will recognize the associated stereo system 110 as a destination for audio data, and will automatically provide the particular device (e.g., stereo system 110) as a selectable destination within the user interface. When the user selects a particular device from those available, a variety of authentication and security exchanges can take place. For example, if password protection is provided as a security feature, the user may be prompted for a password required to use the media unit 106 (i.e., stereo system 110) for audio file playback. Additionally, if the user attempts to select a device that is already in use (for example, by another user), the media unit 106 (i.e., wireless network interface 114) will send a message indicating that it is busy through the user interface.

Once a connection is established between a media source, e.g., a personal computer 104, and the wireless network interface 114 media data corresponding to one or more media items (e.g., songs) can be transmitted from the personal computer 104 to the wireless network interface 114. The transmission can pertain to a file transfer of the media data (media file) or streaming of the media data. The connection remains open so long as media data is being transmitted. Once media data is no longer being transmitted, for example, at the end of playback of a song or album, the connection enters an "idle" state. While in this idle state, the media source can begin successfully transmitting data at any time, as the connection has not been closed. Thus, it would not be necessary to renegotiate or otherwise reestablish the connection.

However, while the media source has a connection in this "idle" state, it can also accept an attempt to establish a connection with another media source. If such an attempt occurs, the connection with the first media source will be closed and a new connection will be established. Preferably, in such case, the first source will also be notified that its connection has been terminated.

Additionally, for digital rights management purposes, it may be desirable to determine that the media unit 106 is authorized to receive an audio data stream and/or that the communications link between the personal computer 104 and the media unit 106 is secure (e.g., encrypted). Typically, this requires some form of authentication, and is preferably based on a public key/private key system. In one embodiment, each media unit 106 may be provided with a plurality of private keys embedded in read only memory (ROM). The media software is then provided with a corresponding plurality of public keys. This allows identification data transmitted from the media unit 106 to the media software to be digitally signed by the media unit 106 using its private key, by which it can be authenticated by the media software using the appropriate public key. Similarly, data sent from the media software to the media unit 106 may be encrypted using a public key so that only a media unit 106 using the corresponding private key can decrypt the data. The media software and the media unit 106 may determine which of their respective pluralities of keys to use based on the exchange of a key index, telling them which of their respective keys to use without the necessity of transmitting entire keys.

It is preferable that authentication of a media unit 106 occur upon initial establishment of a connection to the media software. Upon successful authentication, the media software running on personal computer 104 will open a network connection to the media unit's audio channel and begin sending data. In this embodiment, the media data is "pushed" from the media software to media unit 106 rather than being "pulled" by the media unit 106 from the media software. The media data received by the media unit 106 can be played by the media unit 106, namely, played by the stereo system 110. The media unit 106 receives this audio data, buffers some portion of the data, and begins playing back the audio data once the buffer has reached a predetermined capacity. For example, the media unit 106 may have a total of 8 seconds of buffering, but may begin playback when 2 seconds of audio data have been received. Additionally, it is also possible for the buffer to have a varying capacity, determined, for example, by network traffic or reliability conditions.

In a preferred embodiment, the audio channel is separate from a control channel. For reasons explained below, it is advantageous to have the data channel separate from the control channel. However, a single channel could be used for data and control information.

One advantage to using separate control and data channels is improved response to user commands. As noted above, the media unit 106 includes buffering of data, which compensates for network delays, latency, etc. If control commands are included in the data stream, these commands would not be reached until the media unit 106 plays through the buffer, meaning there would be a delay of up to several seconds before implementing the user command. This is obviously undesirable, and thus a separate channel for control data provides an enhanced user experience.

The packets sent over the data channel (in this example the audio data) are preferably TCP packets in the general form specified by the real-time streaming protocol (RTSP) standard. RTSP is a standard communication protocol known to those skilled in the art. Therefore, implementation details of such a system are not discussed here, although they may be found in Real Time Streaming Protocol Specification dated Feb. 16, 2004, and prior versions, presently available from http://www.rtsp.org and which are hereby incorporated by reference in their entirety. Additionally, although TCP (transmission control protocol) is preferably used because of its robustness, UDP (user datagram protocol) may also be used, particularly in applications where the overhead associated with TCP would be undesirable.

In either case, the data packets can use RTP (real time protocol) headers, and will include both sequence numbers and time stamp information. However, when TCP is used, this sequence and time stamp information is not required for detecting missing packets or reordering packets because TCP automatically provides guaranteed packet delivery and correct sequencing. However, the timing and sequence information is useful for feedback from the media unit 106 to the media control software.

For example, the media unit 106 may periodically provide information about where it is in the playback of the media stream. This may be accomplished by the media unit 106 transmitting over the control channel an indication of the packet currently being played back. Alternatively the media unit 106 may indicate the packet just received as well as the status of the device's buffers. This information is useful to the media software for multiple purposes. For example, if the media software determines that the buffers on the media unit 106 are low, additional data may be transmitted to the device in faster than real time, to insure that the device's buffers do not become completely empty. This information may also be used by the media software for synchronizing visual effects displayed on a monitor (display) of the personal computer 104 or other device with the sound being output from the media unit 106 (i.e., the stereo system 110). Visual effects to be synchronized with the audio playback may take a variety of forms, including various artistic "visualizations," which provide visual effects that are synchronized with the "beats" of the music.

Another use for the packet sequence and time stamp information relates to the case in which the media unit 106 receives an instruction to stop playback and discard all data received up to that point. In such a case, buffering by the media unit 106 requires that the packets to be discarded be identified, which is most readily accomplished using the sequence and timestamp information.

The data payload of the RTP packets contains the audio information to be played back by the media unit 106. In a preferred embodiment, media files may be stored on personal computer 104 in one or more formats, including, for example, MP3 (Motion Picture Expert's Group Layer 3), AAC (Advanced Audio Coding a/k/a MPEG-4 audio), WMA (Windows Media Audio), etc. The media software running on the personal computer 104 decodes these various audio formats, eliminating the need for the media unit 106 to include decoders for multiple formats. This also reduces the hardware performance requirements of media unit 106. Yet another advantage of performing decoding on the personal computer 104 is that various effects may be applied to the audio stream, for example, cross fading between tracks, volume control, equalization, and/or other audio effects. Many of these effects would be difficult or impossible to apply if the media unit 106 were to apply them, for example, because of computational resources required.

In one embodiment, the decoded audio data is compressed by personal computer 104 before transmission to media unit 106. This compression is often accomplished using a lossless compression algorithm to provide maximum audio fidelity. One suitable compressor is the Apple Lossless Encoder, which is available in conjunction with Apple's iTunes® software. The media unit 106 does require a decoder for the compression codec used. It is also desirable that the data stream sent from personal computer 104 to the media unit 106 be encrypted. One suitable form of encryption is AES using a pre-defined key determined as described above.

Figure 2:
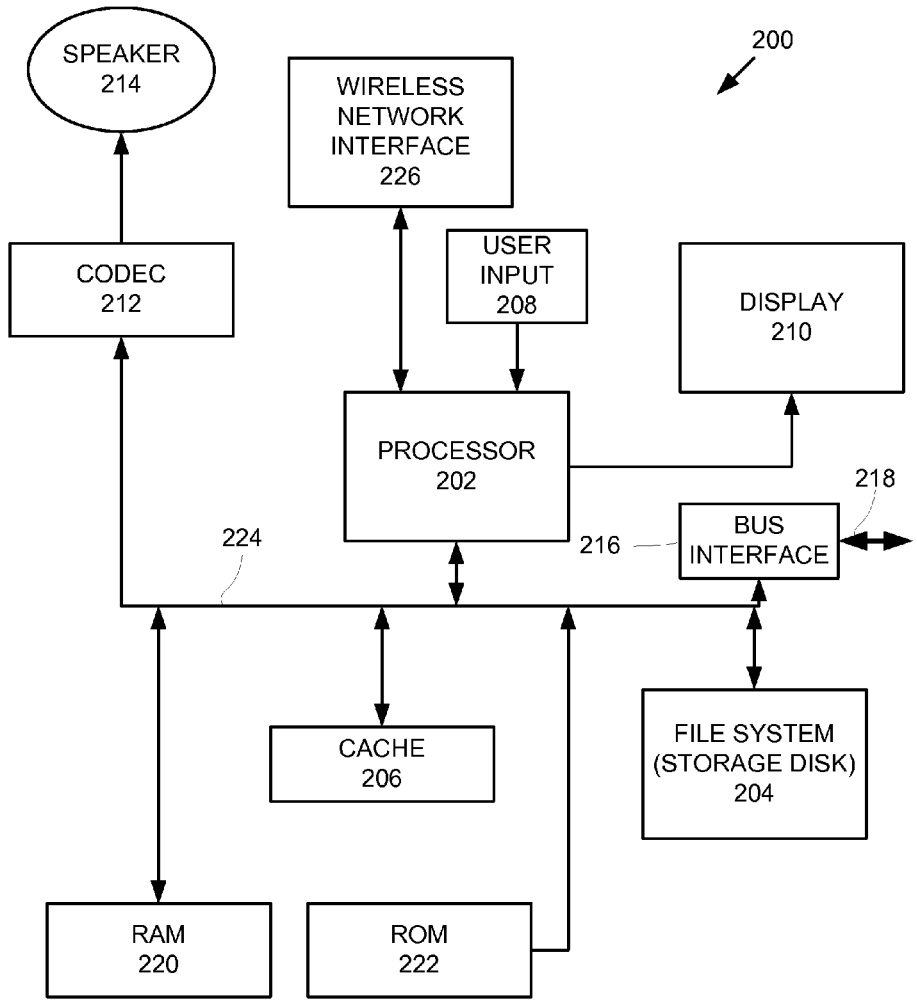
FIG. 2 shows a schematic functional block diagram of a portable media player according to one embodiment of the invention.

FIG. 2 shows a schematic functional block diagram of a portable media player 200 according to one embodiment of the invention. The media player 200 is, for example, suitable for use as the battery powered portable multimedia player 102 shown in FIG. 1. The media player 200 includes a processor 202 that pertains to a microprocessor or controller for controlling the overall operation of the media player 200. The media player 200 stores media data pertaining to media assets in a file system 204 and a cache 206. The file system 204 is, typically, a storage disk or a plurality of disks. The file system 204 typically provides high capacity storage capability for the media player 200. However, since the access time to the file system 204 is relatively slow, the media player 200 can also include a cache 206. The cache 206 is, for example, Random-Access Memory (RAM) provided by semiconductor memory. The relative access time to the cache 206 is substantially shorter than for the file system 204. However, the cache 206 does not have the large storage capacity of the file system 204. Further, the file system 204, when active, consumes more power than does the cache 206. The power consumption is particularly important when the media player 200 is a portable media player that is powered by a battery (not shown). The media player 200 also includes a RAM 220 and a Read-Only Memory (ROM) 222. The ROM 222 can store programs, utilities or processes to be executed in a non-volatile manner. The RAM 220 provides volatile data storage, such as for the cache 206.

The media player 200 also includes a user input device 208 that allows a user of the media player 200 to interact with the media player 200. For example, the user input device 208 can take a variety of forms, such as a button, keypad, dial, etc. Still further, the media player 200 includes a display 210 (screen display) that can be controlled by the processor 202 to display information to the user. A data bus 224 can facilitate data transfer between at least the file system 204, the cache 206, and the processor 202. The media player 200 also includes a bus interface 216 that couples to a data link 218. The data link 218 allows the media player 200 to couple to a host computer over a wired connection.

In one embodiment, the media player 200 serves to store a plurality of media assets (e.g., songs) in the file system 204. When a user desires to have the media player 200 play a particular media item, a list of available media assets is displayed on the display 210. Then, using the user input device 208, a user can select one of the available media assets. The processor 202, upon receiving a selection of a particular media item, supplies the media data (e.g., audio file) for the particular media item to a coder/decoder (CODEC) 212. The CODEC 212 then produces analog output signals for a speaker 214. The speaker 214 can be a speaker internal to the media player 200 or external to the media player 200. For example, headphones or earphones that connect to the media player 200 would be considered an external speaker.

For example, in a particular embodiment, the available media assets are arranged in a hierarchical manner based upon a selected number and type of groupings appropriate to the available media assets. For example, in the case where the media player 200 is an MP3 type media player, the available media assets take the form of MP3 files (each of which corresponds to a digitally encoded song or other audio rendition) stored at least in part in the file system 204. The available media assets (or in this case, songs) can be grouped in any manner deemed appropriate. In one arrangement, the songs can be arranged hierarchically as a list of music genres at a first level, a list of artists associated with each genre at a second level, a list of albums for each artist listed in the second level at a third level, while at a fourth level a list of songs for each album listed in the third level, and so on.

The media player 200 also includes a wireless network interface 226 arranged to wirelessly transmit any selected data from the media player 200 to any appropriately configured receiver unit (e.g., the wireless network interface 114) over a wireless network. In the embodiment shown in FIG. 1, the wireless network interface 226 that takes the form of, for example, a "WiFi" interface according to the IEEE 802.11b or 802.11g standards. Other wireless network standards could also be used, either in alternative to the identified standards or in addition to the identified standards. Such other network standards could include the IEEE 802.11a standard or the Bluetooth standard.

In one embodiment, the media player 200 is a portable computing device dedicated to processing media such as audio. For example, the media player 200 can be a music player (e.g., MP3 player), a game player, a remote controller, a portable communication device, and the like. These devices are generally battery-operated and highly portable so as to allow a user to listen to music, play games or video, record video or take pictures, communicate with others, and/or control other devices. In one implementation, the media player 200 is a handheld device that is sized for placement into a pocket or hand of the user. By being handheld, the media player 200 is relatively small and easily handled and utilized by its user. By being pocket sized, the user does not have to directly carry the device and therefore the device can be taken almost anywhere the user travels (e.g., the user is not limited by carrying a large, bulky and often heavy device, as in a portable computer). Furthermore, the device may be operated by the users hands, no reference surface such as a desktop is needed.

The multimedia player 102 can be used to remotely access and/or control the personal computer 104 to effect any number of changes in the music being streamed to and played by the media unit 106, namely, the stereo system 110. Such changes include selecting different songs, playlists, changing volume, bass, treble, etc. each at the discretion of the user of the multimedia player 102.

Figure 3:
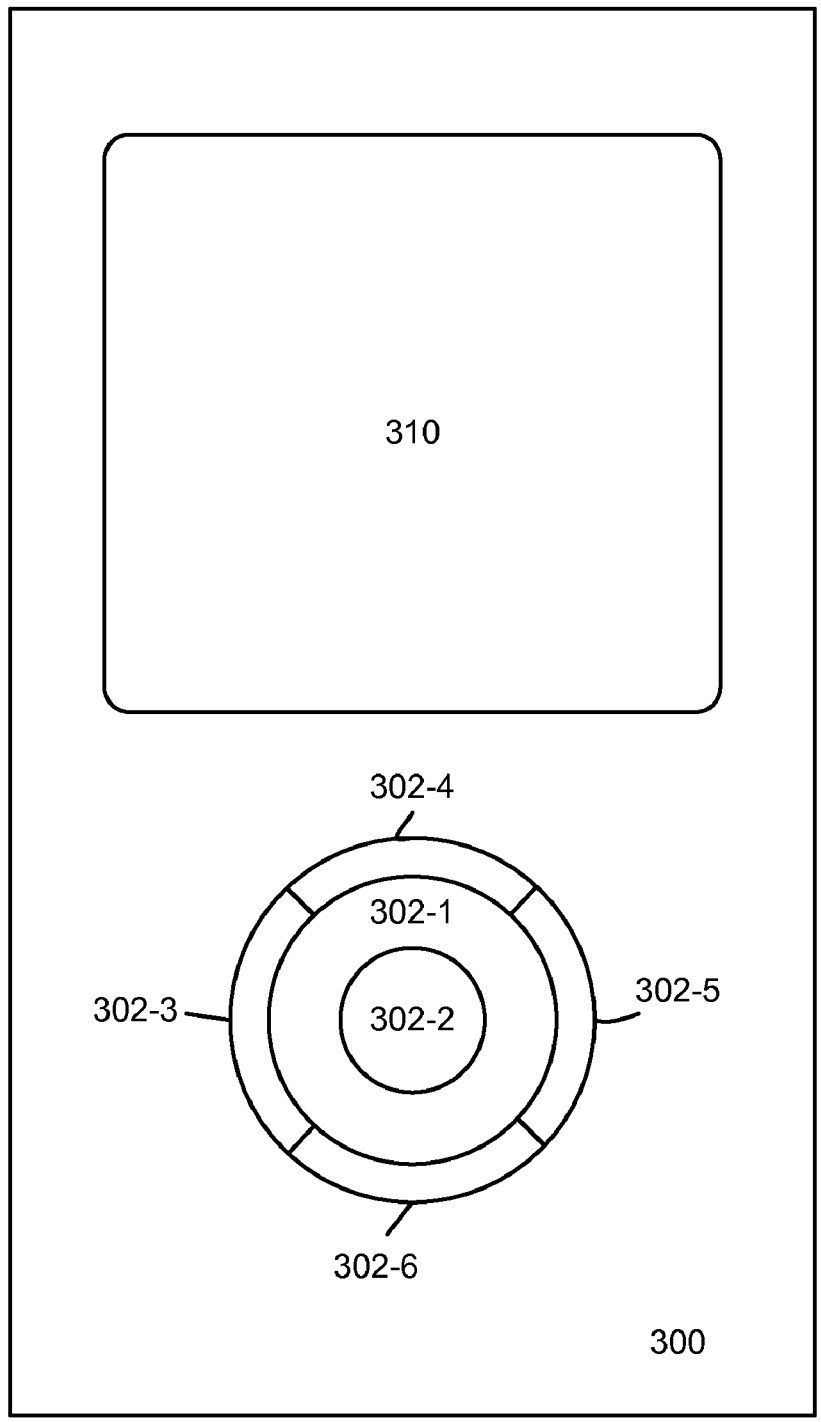
FIG. 3 illustrates a representative multimedia player in accordance with an embodiment of the invention.

FIG. 3 illustrates a representative multimedia player 300 in accordance with an embodiment of the invention that is suitable for use as the multimedia player 102 illustrated in FIG. 1 having a number of input buttons 302. Such input buttons 302 take the form of a rotatable dial 302-1 in the form of a wheel capable of rotation in either a clockwise or counterclockwise direction having at its center a depressable input button 302-2 arranged to receive a user input event such as a press event. Other input buttons 302 include input buttons 302-3 through 302-6 each available to receive user supplied input action. It should be noted that each of the above described buttons can be programmed or otherwise configured singly or in any combination to perform a particular function or suite of functions. For example, if so desired, the rotatable dial 302-1 can be configured to associate a scroll forward function with a clockwise rotation of the dial 302-1 and a scroll back function with a counterclockwise rotation, or vice-versa. In another situation, a user can configure the dial 302-1 to scroll forward with a clockwise rotation in combination with a user supplied input event in the form of a press of the depressable button 302-2 to scroll forward in discrete steps, for example, as opposed to a continuous scroll action. In this way, a user can program any of the buttons 302 (singly or in any combination) to perform any function.

Although the multimedia player 300 makes use of the dial 302-1 and various input buttons 302-2 through 302-6, in another embodiment, the dial 302-1 can be replaced by a touch pad, preferably a touch pad supporting circular inputs. Also, the buttons 302-2 through 302-6 can be provided elsewhere. For example, if a touch pad is used, the buttons 302-2 through 302-6 can be associated with portion of the touch pad, dispersed about and beyond the outer periphery of the touch pad, or provided underneath the touch pad.

Figure 4:
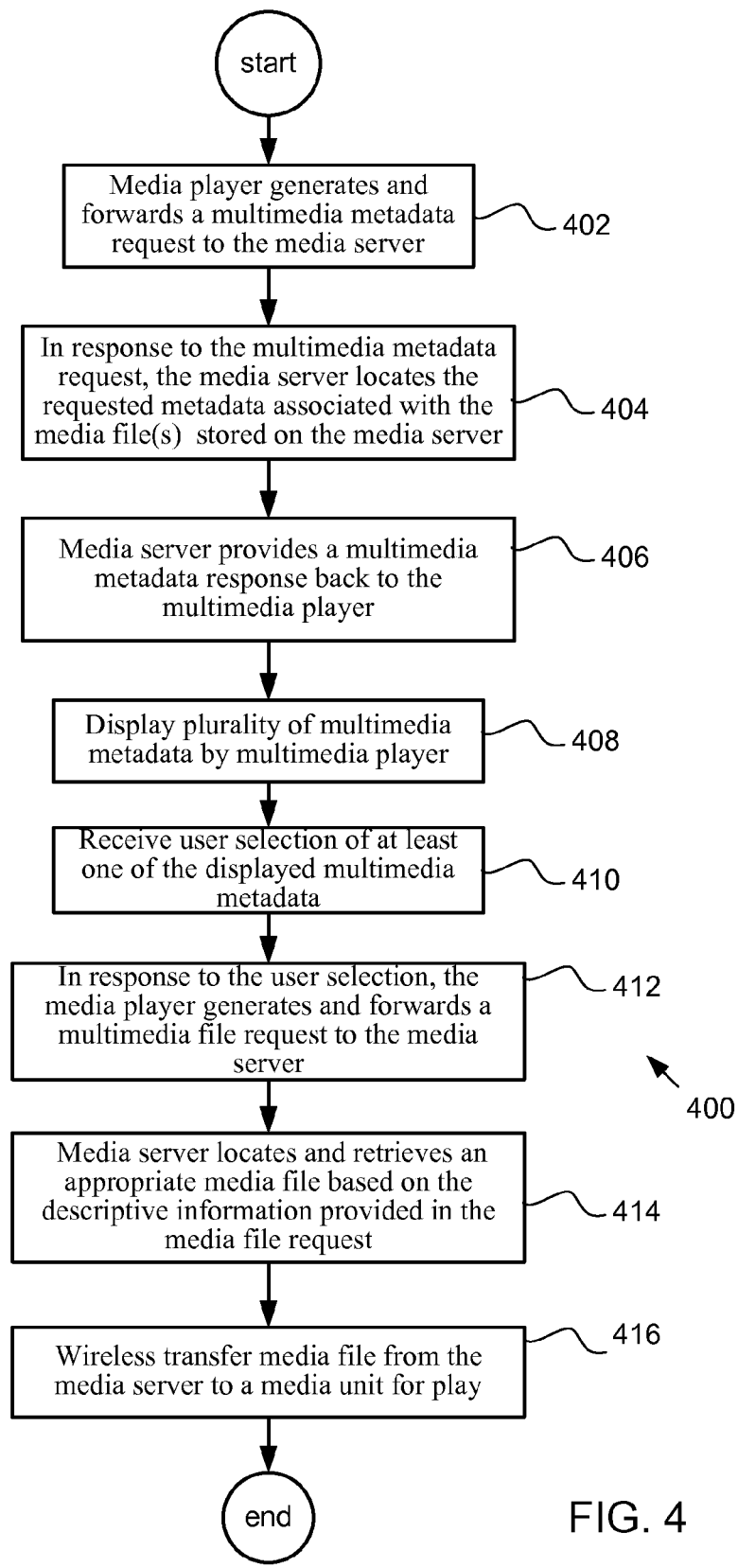
FIG. 4 shows a flow diagram of remotely accessing a media server in order to effect a change to a streamed digital media file according to one embodiment of the invention.

FIG. 4 shows a flow diagram of remotely accessing a media server in order to effect a change to a streamed digital media file according to one embodiment of the invention. The process 400 begins by the multimedia player generating a multimedia metadata request that is then forwarded to the media server 402. In response to the multimedia metadata request, the media server locates the requested metadata associated with the media file(s) 404 stored on the media server. Typically, the multimedia metadata request is a request for a catalog of all media items available on the media server. The catalog is typically predetermined and stored on the media server. However, if not, the catalog can be generated when requested. The catalog requested need not be for all the media items available on the media server. In any event, for a given media item (e.g., song), the metadata can include, song title, author, track duration, etc. that corresponds to the requested song and is typically much smaller in size than the associated media file. Once the metadata has been identified, the media server can provide a multimedia metadata response 406 back to the multimedia player for storage thereon. In this case, the song title, author or other identifying indicia is returned to the multimedia player where it is stored for later retrieval.

Once the appropriate metadata (e.g., catalog of available media items) is stored on the multimedia player, the multimedia player displays the available metadata (or portions thereof) 408. At this point, a user has the option of selecting any of the media items associated with the displayed metadata 410. For example, the user can select a new song to be played. Once a particular media item has been selected, a multimedia file request is generated at the media player consistent with the metadata corresponding to the selected media item and is then forwarded to the media server 412. It should be noted that the media file request need only include descriptive information (e.g., metadata) necessary to uniquely identify the selected song by the media server. At no time is the song data itself transferred from the media player to the media server, thereby avoiding any copyright infringement based upon protected content. Indeed, it may be that the multimedia player does not include the song data. In addition, since the media file request represents a small data transfer (on the order of a few kilobytes), the amount of power required for the generation and forwarding of the media file request from the multimedia player to the media server is substantially reduced over that which would be required to send the full media file. In this way, a user can effectively provide remote control of the media unit, e.g., the stereo system, by way of the media server without adversely affecting battery life of the multimedia player.

Once the media server has received the media file request, an appropriate media file is retrieved from the media server and wirelessly forwarded by way of the wireless network interface across the wireless network to a media unit (such as the stereo 110). In some cases, the media file being wirelessly forwarded is accompanied by an associated control command to control the stereo system, such as to change the volume, treble, bass, etc.

Figure 5A:
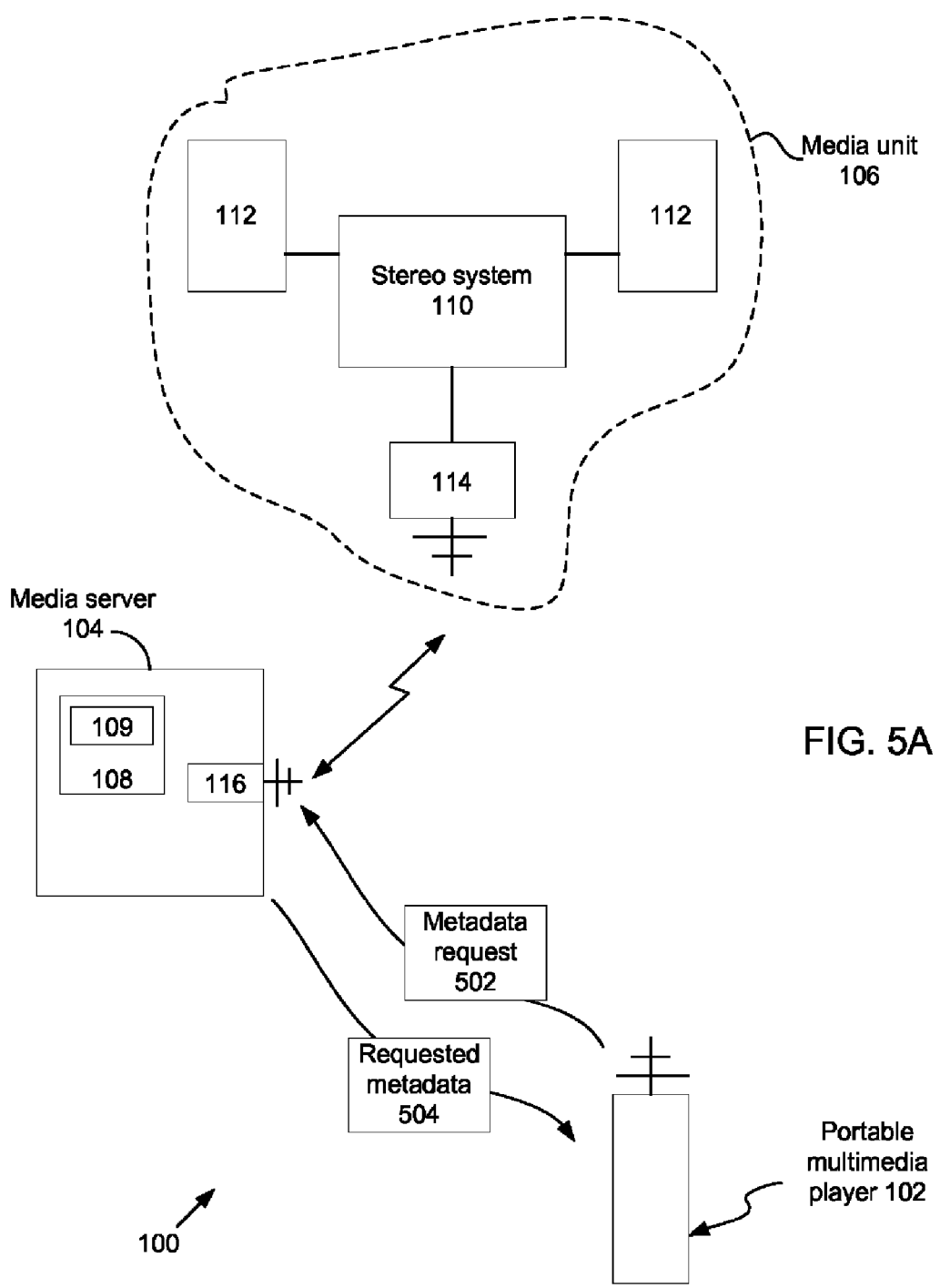
FIGS. 5A-5B shows how the multimedia player can be used to remotely access the personal computer to effect any number of changes in the music being streamed to and played by the stereo.
Figure 5B:
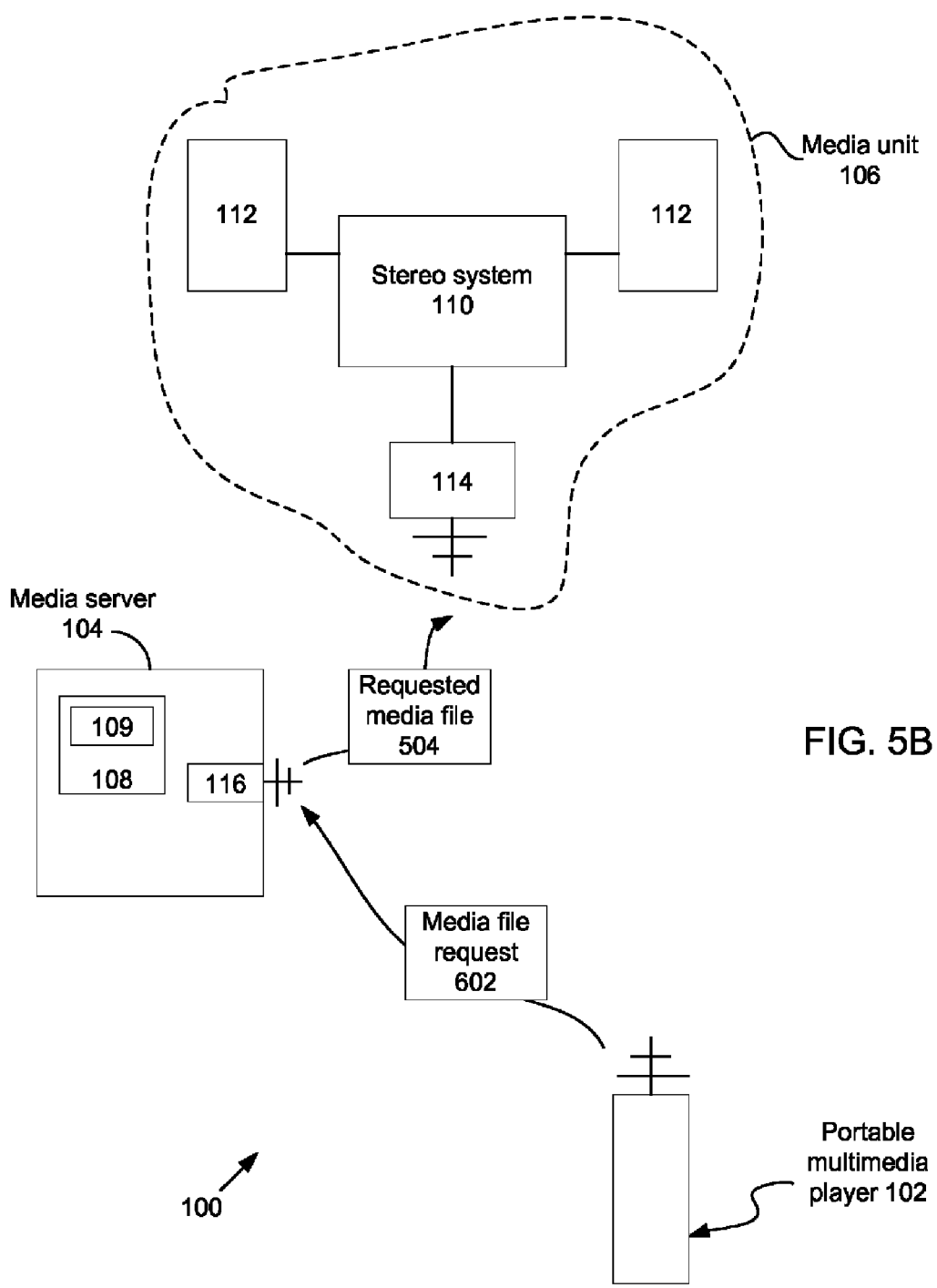

FIGS. 5A-5B graphically illustrate a data flow between the multimedia player 102, the media server 104, and the media unit 106 in accordance with an embodiment of the invention. Once a user has interacted with the multimedia player 102 to, for example, select a new song to be played, the multimedia player 102 generates a multimedia metadata request 502 that is then forwarded to the personal computer 104. In response to the multimedia metadata request 502, the personal computer 104 locates the requested metadata associated with the media file(s) 106 (e.g., audio tracks) stored on the personal computer 104. Typically, the multimedia metadata request 502 is a request for a catalog of all media items available on the personal computer 104. The catalog is typically predetermined and stored on the personal computer 104. However, if not, the catalog can be generated when requested. The catalog requested need not be for all the media items available on the personal computer 104. In any event, for a given media item (e.g., song), the metadata can include, song title, author, track duration, etc. that corresponds to the requested song and is typically much smaller in size than the associated media file. Once the metadata has been identified, the personal computer 104 can provide a multimedia metadata response 504 back to the multimedia player 102 for storage thereon. In this case, the song title, author or other identifying indicia is returned to the multimedia player 102 where it is stored for later retrieval.

Once the appropriate metadata (e.g., catalog of available media items) is stored on the multimedia player 102, a user has the option of selecting any of the media items associated with the stored metadata to be remotely played. For example, the user can select a new song to be played using the GUI 310 that can display at least a portion of the stored metadata that was previously received from the personal computer 104. As illustrated by FIG. 5B, once a particular media item has been selected, a multimedia file request 602 is generated at the media player 102 consistent with the metadata corresponding to the selected media item. The multimedia file request 602 is then forwarded to the personal computer 104. It should be noted that the media file request 602 need only include descriptive information (e.g., metadata) necessary to uniquely identify the selected song by the personal computer 104. At no time is the song data itself transferred from the media player 102 to the personal computer 104, thereby avoiding any copyright infringement based upon protected content. Indeed, it may be that the multimedia player 102 does not include the song data. In addition, since the media file request 602 represents a small data transfer (on the order of a few kilobytes), the amount of power required for the generation and forwarding of the media file request 602 from the multimedia player 102 to the personal computer 104 is substantially reduced over that which would be required to send the full media file. In this way, a user can effectively provide remote control of the media unit, e.g., the stereo system 110, by way of the personal computer 104 without adversely affecting battery life of the multimedia player 102.

Once the personal computer 104 has received the media file request 602, an appropriate media file 604 is retrieved from the personal computer 104 based on the descriptive information provided in the media file request 602. In one embodiment, the appropriate media file 604 is retrieved from the hard drive 108 and wirelessly forwarded by way of the wireless network interface 116 across the wireless network to the stereo system 110 via the wireless network interface 114. In some cases, the media file being wirelessly forwarded is accompanied by an associated control command to control the stereo system 110, such as to change the volume, treble, bass, etc.

In some cases, the multimedia player 102 will periodically wirelessly synchronize to the personal computer 104. The synchronization can be manually or automatically initiated. The synchronization can synchronize metadata as well as media data between the multimedia player 102 and the personal computer 104. Often, the synchronization only provides a subset of the available metadata and media items from the personal computer 104 to the multimedia player 102, which has less storage capacity.

Figure 6:
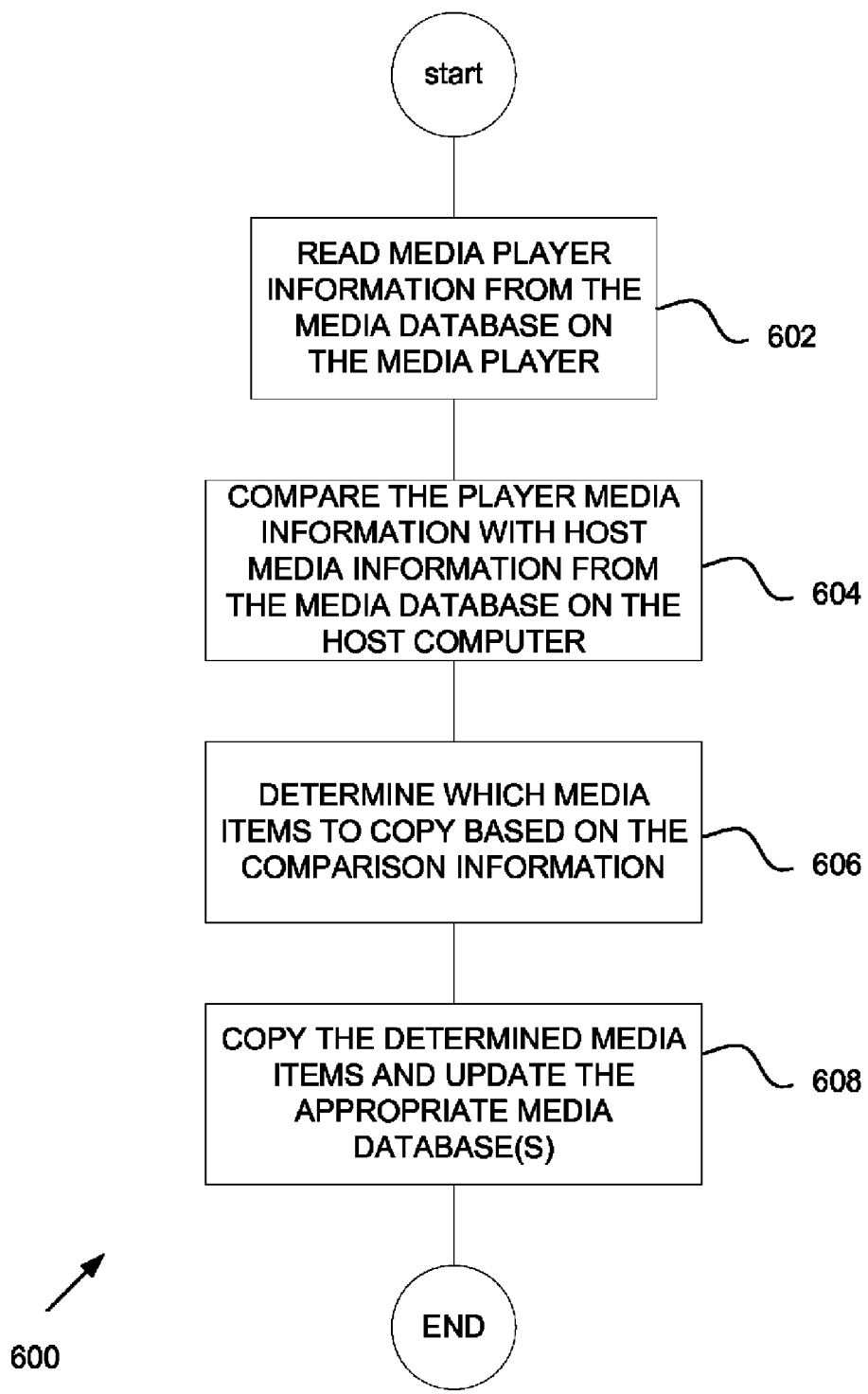
FIG. 6 that is a flow diagram of synchronization processing according to one embodiment of the invention.

FIG. 6 shows a flow diagram of synchronization processing 600 according to one embodiment of the invention. The synchronization processing 600 is, for example, performed by the personal computer 104 illustrated in FIG. 1. More specifically, the synchronization processing 600 is performed by a media management application (e.g., iTunes software).

The synchronization processing 600 initially reads 602 player media information from a media database on a media player. Next, the player information is compared 604 with first media file information from a media database on a host computer (e.g., personal computer). Such comparison produces comparison information concerning differences between the player information and the host information. Next, the synchronization processing 600 determines 606 one or more media items to copy between the host computer and the media player based on the comparison information. For example, media items (e.g., audio files for songs) can be compared using media metadata such as song title, album name and/or artist name which pertain to characteristics or attributes of the media items. Thereafter, the determined one or more media items are copied 608 and the appropriate metadata are updated to the corresponding media database. Following the operation 608, the synchronization processing 600 is complete and ends.

According to one embodiment, the comparison of player media information and host media information is performed using media attributes of the various media items. Namely, a media item on the media player can be deemed the same media item as resident on the host computer if its media attributes sufficiently match. Examples of media attributes include title, album, track, artist, composer and genre. These attributes are particular to a particular media item. In addition, other media attributes can pertain to quality characteristics of the media item. Examples of such media attributes include bit rate, sample rate, equalization setting, volume adjustment, start/stop and total time as well as associated preference file(s). Hence, in one embodiment, if the above-identified media attributes pertaining to a media item on the media player all match those same media attributes pertaining to a media item on the host computer, then the two media items stored on different devices can be deemed the same even though still further attributes or characteristics may cause these media items to not be exact duplications of one another. For example, if modification dates associated with respective files storing the media items were different, this difference in modification date would not trigger the copying of such media items from the host computer to the media player when the above-identified media attributes match. However, if the programmable button preference files do not match, then only the programmable button preference files are updated.

Hence, the intelligence of the synchronization processing allows the amount of data transfer to be properly managed such that it is relatively low or minimized. Although the synchronization processing 700 makes use of media databases at the host computer and the media player, in another embodiment, the needed host media information and the player media information can be gathered from the media items themselves. In one implementation, such media information can be acquired from metadata provided with the media items. However, by providing the media databases, synchronization is able to be performed more efficiently and quickly.

While the invention has been disclosed with respect to a limited number of embodiments, numerous modifications and variations will be appreciated by those skilled in the art. For example, for this disclosure, the term "computer" does not necessarily mean any particular kind of device, combination of hardware and/or software, nor should it be considered restricted to either a multi purpose or single purpose device. Additionally, although the invention has been described particularly with respect to the output or distribution of multimedia information, it should be understood that the inventive concepts disclosed herein are also generally applicable to the input or collection of such information. It is intended that all such variations and modifications fall with in the scope of the following claims.

What is claimed is:

1. A portable digital media player capable of communicating with a media server, the portable digital media player comprising:
    a wireless network interface;
    a display device arranged to display a user interface having a number of user selectable items;
    a processor unit configured to operate the portable digital media player in a first mode or a second mode; and
    a storage medium configured to store computer program code, the computer program code including at least:
        computer program code for displaying a list of digital media files on a display device of the portable digital media player, the digital media files stored on the portable digital media player;
        computer program code for receiving a selection signal to play a digital media file;
        computer program code for playing the selected digital media file on the portable digital media player when the portable digital media player is operated in a first mode; and
        computer program code for wirelessly sending the selected digital media file to the media server via the wireless network interface when the portable digital media player is operated in a second mode.

2. A portable digital media player as recited in claim 1, wherein the computer program code stored in the storage medium of the portable digital media player further includes:
computer program code for associating the portable digital media player and the media server.

3. A portable digital media player as recited in claim 1, wherein the computer program code for associating comprises computer program code for binding the portable media player and the media server.

4. A portable digital media player as recited in claim 1, wherein the media server is a computing device that includes a personal computer.

5. A portable digital media player as recited in claim 1, wherein the media server is capable of interacting with a remote media unit, and whereby the media server wirelessly causes the selected digital media file to be played by the remote media unit.

6. A portable digital media player as recited in claim 5, wherein the remote media unit is a home audio system.

7. A portable digital media player as recited in claim 1, wherein the media server is capable of interacting with a remote media unit, and whereby the media server wirelessly sends the selected digital media file to the remote media unit.

8. A portable digital media player as recited in claim 1, wherein the computer program code including at least:
computer program code for wirelessly sending a user command from the portable digital media player to the media server.

9. A portable digital media player as recited in claim 8, wherein the user command controls playback of the identified media item.

10. A portable digital media player as recited in claim 9, wherein the user command controls at least one action at the media server.

11. A portable digital media player as recited in claim 8, wherein the user command requests that a playback attribute of playback of the identified media item be changed.

12. A portable digital media player as recited in claim 11, wherein the playback attribute comprises a volume change.

13. A portable digital media player as recited in claim 1, wherein the identified media file pertains to a song or a playlist.

14. A portable digital media player capable of communicating with a media server, the portable digital media player comprising:
a wireless network interface;
a display device arranged to display a user interface having a number of user selectable items;
a processor unit configured to operate the portable digital media player in a first mode or a second mode; and
a storage medium configured to store computer program code, the computer program code including at least:
computer program code for displaying a list of digital media files on a display device of the portable digital media player, the digital media files stored on the portable digital media player;
computer program code for receiving a selection signal to play a digital media file;
computer program code for playing the selected digital media file on the portable digital media player when the portable digital media player is operated in a first mode; and
computer program code for wirelessly sending an indication of the selected digital media file to the media server via the wireless network interface when the portable digital media player is operated in a second mode.

15. A portable digital media player as recited in claim 14, wherein the computer program code stored in the storage medium of the portable digital media player further includes:
computer program code for associating the portable digital media player and the media server.

16. A portable digital media player as recited in claim 14, wherein the computer program code for associating comprises computer program code for binding the portable media player and the media server.

17. A portable digital media player as recited in claim 14, wherein the media server is a computing device that includes a personal computer.

18. A portable digital media player as recited in claim 14, wherein the media server is capable of interacting with a remote media unit, and
where the portable digital media player informs the media server of the selected digital media file via the wireless network interface, and whereby the media server wirelessly sends the selected digital media file to the remote media unit.

19. A portable digital media player as recited in claim 18, wherein the media unit is a home audio system.

20. A portable digital media player as recited in claim 14, wherein the computer program code including at least:
computer program code for wirelessly sending a user command from the portable digital media player to the media server.

21. A portable digital media player as recited in claim 14, wherein the user command controls playback of the identified media item.

22. A portable digital media player as recited in claim 21, wherein the user command controls at least one action at the media server.

23. A portable digital media player as recited in claim 22, wherein the user command requests that a playback attribute of playback of the identified media item be changed.

24. A portable digital media player as recited in claim 23, wherein the playback attribute comprises a volume change.

25. A portable digital media player as recited in claim 14, wherein the identified media file pertains to a song or a playlist.

* * * * *